United States Patent
Nishimura et al.

(10) Patent No.: US 10,514,099 B2
(45) Date of Patent: Dec. 24, 2019

(54) METHOD FOR HANDLING CARRIER-FILM-EQUIPPED GASKET

(71) Applicant: NOK CORPORATION, Tokyo (JP)

(72) Inventors: Takuro Nishimura, Kanagawa (JP); Hajime Yui, Kanagawa (JP); Kenichi Oba, Kanagawa (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 15/770,945

(22) PCT Filed: Nov. 4, 2016

(86) PCT No.: PCT/JP2016/082737
§ 371 (c)(1),
(2) Date: Apr. 25, 2018

(87) PCT Pub. No.: WO2017/082154
PCT Pub. Date: May 18, 2017

(65) Prior Publication Data
US 2018/0313448 A1    Nov. 1, 2018

(30) Foreign Application Priority Data
Aug. 2, 2016 (JP) ................................. 2016-151710

(51) Int. Cl.
*B32B 43/00* (2006.01)
*F16J 15/08* (2006.01)
(Continued)

(52) U.S. Cl.
CPC ......... *F16J 15/0818* (2013.01); *F16J 15/061* (2013.01); *F16J 15/10* (2013.01);
(Continued)

(58) Field of Classification Search
CPC . B32B 38/10; B32B 43/006; Y10T 156/1179; Y10T 156/1195; Y10T 156/1983; Y10T 156/1994
(Continued)

(56) References Cited

U.S. PATENT DOCUMENTS 4,643,864 A * 2/1987 Martini ............... B29C 33/0011
    249/139
5,536,342 A * 7/1996 Reis ..................... H05K 9/0015
    156/265
(Continued)

FOREIGN PATENT DOCUMENTS

DE    4243989 A1    7/1994
FR    2832482 A1    5/2003
(Continued)

OTHER PUBLICATIONS

International Search Report issued with respect to Application No. PCT/JP2016/082737, dated Jan. 24, 2017.
(Continued)

*Primary Examiner* — Mark A Osele
*Assistant Examiner* — Nickolas R Harm
(74) *Attorney, Agent, or Firm* — Greenblum & Bernstein, P.L.C.

(57) ABSTRACT

An object of the present invention is to make it possible to easily remove a carrier film when removing the carrier film from a gasket body in a carrier-film-equipped gasket, which includes a combination of a rubber-only type gasket body and a resinous carrier film that retains the gasket body, even if the gasket body is adhered to the carrier film. To fulfill the object, a step for peeling, against an adhesive force, the carrier film from the gasket body in a state in which the gasket body is fixed to a base, is carried out. As a preliminary step of the peeling step, the gasket body is pressed from the
(Continued)

carrier film side by a pressing device thereby to decrease the adhesion area between the gasket body and the carrier film, and the peeling step is carried out in a state in which the adhesion area has been decreased.

7 Claims, 16 Drawing Sheets

(51) Int. Cl.
| | |
|---|---|
| *F16J 15/10* | (2006.01) |
| *H01M 8/0273* | (2016.01) |
| *H01M 8/0284* | (2016.01) |
| *F16J 15/06* | (2006.01) |
| *B32B 38/10* | (2006.01) |
| *H01M 8/0276* | (2016.01) |
| *H01M 8/0286* | (2016.01) |

(52) U.S. Cl.
CPC ....... *H01M 8/0273* (2013.01); *H01M 8/0284* (2013.01); *B32B 38/10* (2013.01); *B32B 43/006* (2013.01); *H01M 8/0276* (2013.01); *H01M 8/0286* (2013.01); *Y10T 156/1179* (2015.01); *Y10T 156/1195* (2015.01); *Y10T 156/1983* (2015.01); *Y10T 156/1994* (2015.01)

(58) Field of Classification Search
USPC .................................. 156/716, 719, 765, 767
See application file for complete search history.

(56) References Cited

U.S. PATENT DOCUMENTS

| | | |
|---|---|---|
| 5,564,714 A | 10/1996 | Katsuno et al. |
| 8,012,284 B2* | 9/2011 | Debe ................... H01M 8/0202 156/182 |
| 2005/0077683 A1 | 4/2005 | Comert et al. |
| 2006/0127732 A1 | 6/2006 | Yoshida et al. |
| 2007/0298272 A1* | 12/2007 | Kusakawa ........ B29C 45/14336 428/515 |
| 2016/0285120 A1* | 9/2016 | Nakano ...................... C09J 5/00 |
| 2018/0163870 A1* | 6/2018 | Saso ................... H01M 8/0271 |

FOREIGN PATENT DOCUMENTS

| | | |
|---|---|---|
| JP | 2002-147610 A | 5/2002 |
| JP | 2006-164881 A | 6/2006 |
| JP | 2014-60133 A | 4/2014 |
| WO | 2016/163158 A | 10/2016 |

OTHER PUBLICATIONS

International Preliminary Report on Patentability issued with respect to Application No. PCT/JP2016/082737, dated May 15, 2018.
European Search Report issued with respect to Application No. 16864117.3, dated Oct. 12, 2018.

* cited by examiner

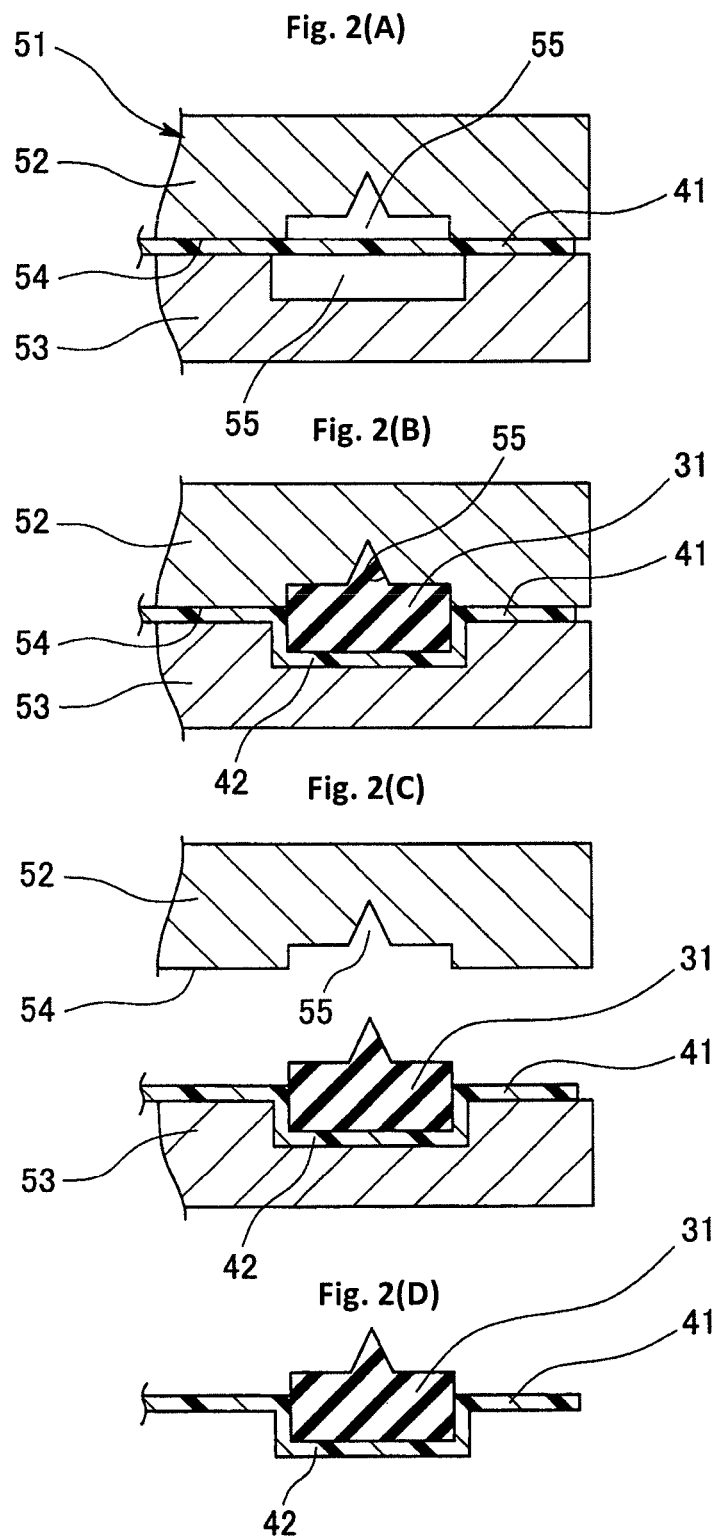

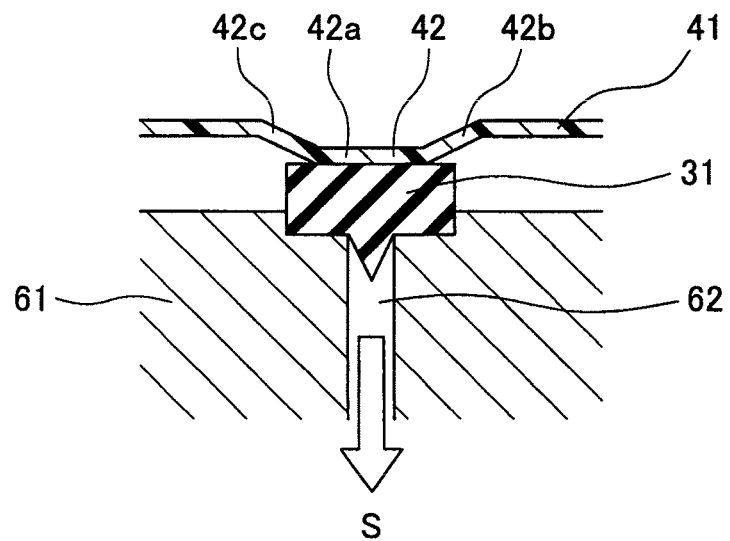
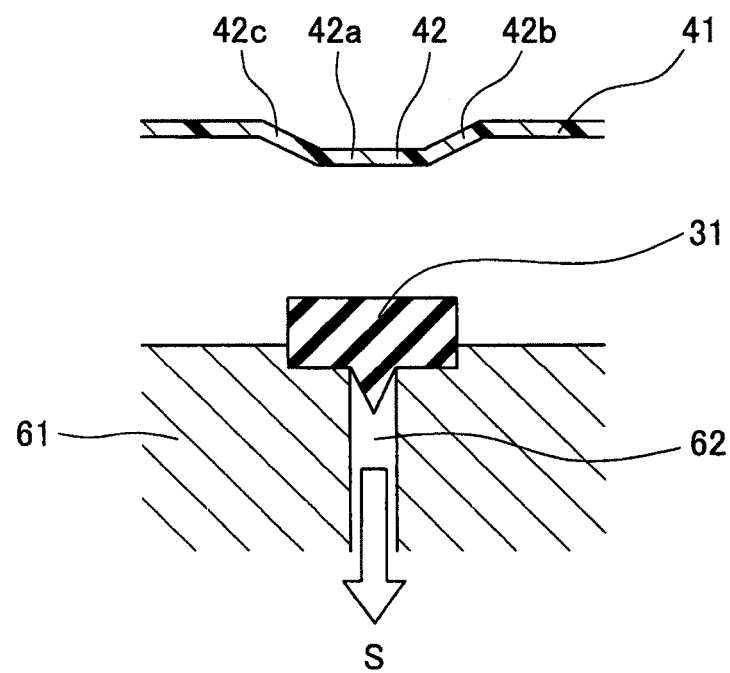

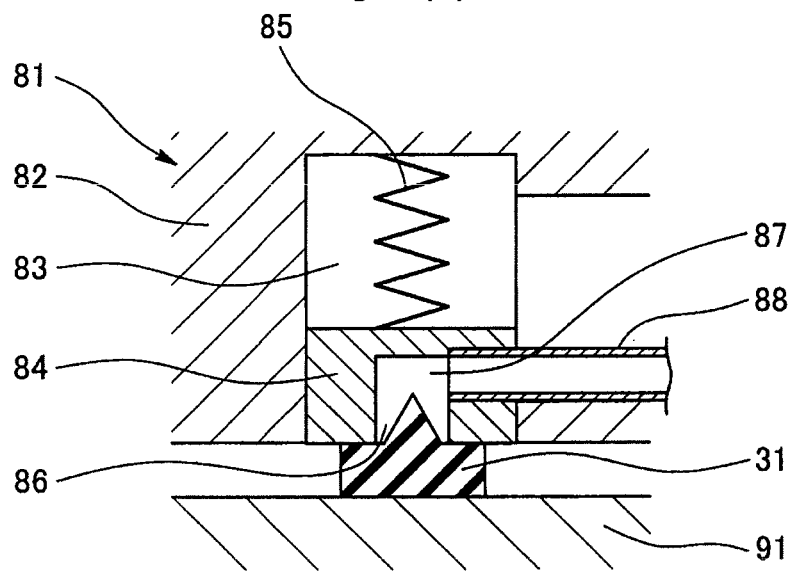
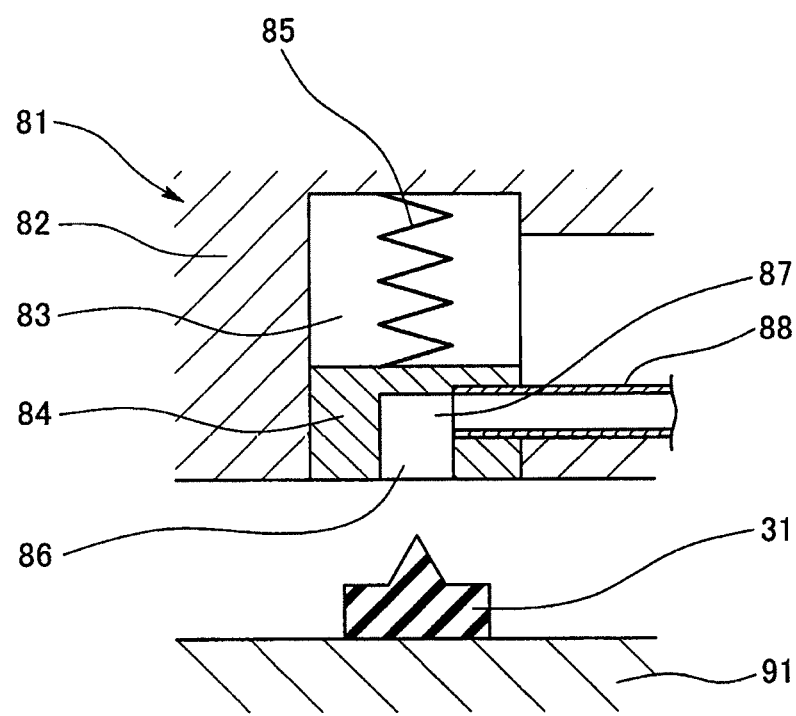

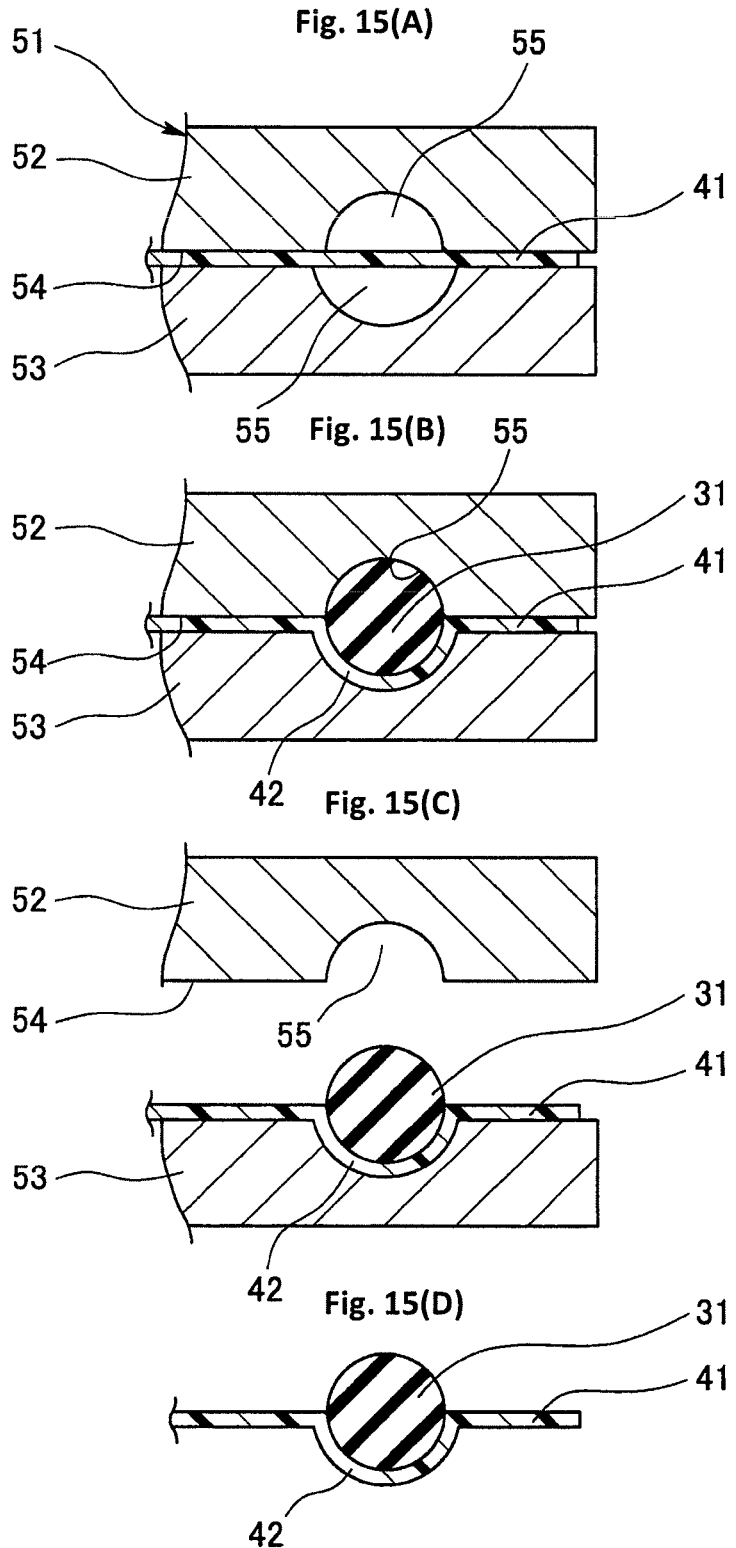

METHOD FOR HANDLING CARRIER-FILM-EQUIPPED GASKET

BACKGROUND OF THE INVENTION

Field of the Invention

The present invention relates to a gasket associated with a sealing technology and more specifically to a method for handling a carrier-film-equipped gasket to remove a carrier film from a gasket body against an adhesive force in the carrier-film-equipped gasket including a combination of a rubber-only type gasket body and a resinous carrier film that holds the gasket body. The gasket in accordance with the present invention is used, for example, as the gasket for a fuel battery or as a general gasket for other applications.

Description of the Conventional Art

Fuel battery gaskets having various configurations are available, including a rubber-only type gasket composed of a discrete gasket made of a rubber-like elastic material (rubber), a separator integrated gasket formed by molding a gasket, which is composed of a rubber-like elastic material, integrally with a separator, and a GDL integrated gasket formed by molding a gasket, which is composed of a rubber-like elastic member, integrally with a GDL (gas diffusion layer).

Each of these gaskets has a characteristic. However, because of the recent high demand for reduced cost, rubber-only type gaskets, which can satisfy such demand, are becoming a focus of attention.

A rubber-only type gasket is configured as illustrated in, for example, FIG. 13.

More specifically, a gasket 11, which is shaped like a plane (like a flat plate) as a whole, is provided with an outer peripheral sealing section 12 for sealing the entire periphery of the reaction surface of a fuel battery, the outer peripheral sealing section 12 being shaped like a planar rectangular frame. Further, it is necessary to partition the reaction surface of the fuel battery and each manifold section, so that inner sealing sections 13 are integrally provided at both ends in the longitudinal direction of the outer peripheral sealing section 12. The cross-sectional shape of the gasket 11 is, for example, circular, as illustrated in FIG. 13(B).

PRIOR ART DOCUMENTS

Patent Documents

Patent Document 1: Japanese Unexamined Patent Publication No. 2014-60133 (refer to a gasket 3 in FIG. 1, etc.)

However, the rubber-only type fuel battery gasket 11 has the following room to be further improved.

Generally, in the fuel battery gasket 11, the planar external dimensions are set to be large, approximately 400 mm×300 mm, while the sectional dimension (diameter) is set to be small, approximately 1 mm to a few millimeters. This tends to cause the gasket 11 in a discrete form to be twisted when being carried or stacked, making it difficult to handle the gasket 11 (poor handling property).

SUMMARY OF THE INVENTION

Problem to be Solved by the Invention

The present applicant, therefore, has developed and proposed a carrier-film-equipped gasket 21 including a combination of a rubber-only type gasket body 31 and a resinous carrier film 41 that retains the gasket body 31, as illustrated in FIG. 14. According to the carrier-film-equipped gasket 21, the rubber-only type gasket body 31 is retained by the carrier film 41 that is stronger than the gasket body 31, thus making the carrier-film-equipped gasket 21 resistant to twisting and therefore enabling handling property to be improved.

As with the gasket 11 illustrated in FIG. 13, the gasket body 31 is shaped like a plane (like a flat plate) as a whole, and is provided with an outer peripheral sealing section 32 which seals the entire periphery of the reaction surface of a fuel battery and which is shaped like a planar rectangular frame. Further, inner sealing sections 33 are integrally provided at both ends in the longitudinal direction of the outer peripheral sealing section 32 in order to partition the reaction surface of a fuel battery and each manifold section. The cross-sectional shape of the gasket body 31 is, for example, circular, as illustrated in FIG. 14(B). Meanwhile, the carrier film 41 is formed of a resinous film having a planar rectangular shape that is slightly larger than the gasket body 31. Formed on the plane is a gasket holding section 42 having a three-dimensional shape for retaining the gasket body 31.

The carrier-film-equipped gasket 21 is manufactured as described below. For the manufacture, a mold for injection-molding the rubber-only type gasket body 31 can be used.

In the process, first, the planar carrier film 41, which has been cut into a planar shape of a predetermined size, is prepared. Then, the carrier film 41 is held in a parting section 54 of a mold 51 and mold-clamped by the mold 51, as illustrated in FIG. 15(A). The mold 51 is composed of a combination of an upper die (one split die) 52 and a lower die (the other split die) 53, and each of the dies 52 and 53 has a cavity 55 corresponding thereto at the parting section 54. The entire surface of the carrier film 41 in its initial state is planar, so that the carrier film 41 is laid across the cavities 55.

Subsequently, as illustrated in FIG. 15(B), a molding material for molding the gasket body 31 is charged into the cavities 55 and heated or the like to mold the gasket body 31. When the molding material is charged in the cavities 55, a part of the plane of the carrier film 41 is pressed against the inner surface of the cavity 55 of the lower die 53 by the molding material charging pressure and deformed (plastically deformed) along the inner surface of the cavity 55, thus molding the gasket holding section 42 having the three-dimensional shape.

Subsequently, after molding the gasket body 31, the mold is opened, as illustrated in FIG. 15(C), and the gasket body 31 and the carrier film 41 are simultaneously taken out of the mold 51, as illustrated in FIG. 15(D). The gasket body 31 and the carrier film 41, which have been taken out, are in a combined state in which the gasket body 31 is retained by the carrier film 41. The product is conveyed or stored in the combined state. The gasket body 31 retained by the carrier film 41 is resistant to twisting or the like, thus improving the handling property over the case where the gasket body 31 is handled alone.

When installing the gasket body 31 to a fuel battery stack, the carrier film 41 is removed from the gasket body 31 and only the gasket body 31 is installed to the fuel battery stack.

The carrier film 41 is removed from the gasket body 31 as illustrated in, for example, FIGS. 16(A) and 16(B). The gasket body 31 is placed on a suction section 62 of a vacuuming device 61 serving as a base, and the gasket body 31 is fixed (suctioned) by vacuuming (arrow S). In this state, the carrier film 41 is removed from the gasket body 31. At this time, the carrier film 41, which does not adhere to the gasket body 31, should be easily removed. However, if the gasket body 31 has an adhesive property on its surface mainly due to the characteristic of the material of the gasket body 31 and adheres to the carrier film 41, then the carrier film 41 has to be strongly pulled off from the gasket body 31, making the removal difficult.

In view of the aspects described above, an object of the present invention is to provide a method for handling a carrier-film-equipped gasket that enables a carrier film to be easily removed even if a gasket body is adhered to the carrier film when the carrier film is removed from the gasket body in the carrier-film-equipped gasket including a combination of a rubber-only type gasket body and a resinous carrier film that retains the gasket body.

Means for Solving the Problem

To this end, a method for handling a gasket in accordance with the present invention is a method for removing a resinous carrier film from a rubber-only type gasket body in a carrier-film-equipped gasket including a combination of the gasket body and the carrier film that retains the gasket body. According to the method, a step of peeling the carrier film from the gasket body against an adhesive force in a state in which the gasket body is fixed to a base is carried out, the gasket body is pressed from a carrier film side by using a pressing device thereby to decrease an adhesion area between the gasket body and the carrier film as a preliminary step of the peeling step, and the peeling step is carried out in a state in which the adhesion area has been decreased.

In the handling method according to the present invention that has the foregoing configuration, the step of peeling a carrier film from a gasket body against an adhesive force in a state in which the gasket body is fixed to a base is carried out, and the adhesion area between the gasket body and the carrier film is decreased according to a predetermined procedure as a preliminary step (pretreatment step). Hence, the peel force can be decreased by the reduction in the adhesion area, thus making the removing operation easier.

If a gasket holding section having a three-dimensional shape that has been deformed along the external shape of the gasket body is provided at a portion where the carrier film planarly overlaps the gasket body, then the carrier film and the gasket body adhere to each other in a state in which a part or all of the gasket body is placed in the gasket holding section, so that the size of the adhesion area is defined by the area of the inner surface of the gasket holding section. In this case, therefore, the adhesion area that is defined by the area of the inner surface of the gasket holding section is decreased in the preliminary step.

A pressing device having a pressing projection section that presses the gasket body from the carrier film side is ideally used as the pressing device used in the preliminary step of the peeling step. In particular, setting the width dimension of the pressing projection section to be smaller than the width dimension of the gasket body causes the peeling to extend to both sides of the pressing projection section, so that the peeling area increases, thus making it possible to further decrease the adhesion area.

Further, in the pressing projection section, a plurality of projections may be arranged with intervals provided therebetween along the longitudinal direction of the gasket body. In this case, the void between projections that are adjacent to each other will be a non-pressing portion that does not press the gasket body, and the carrier film will be in a state of being separate from the gasket body at the non-pressing portion. This mode, therefore, will also increase the peeling area, thus making it possible to further decrease the adhesion area.

The preliminary step and the peeling step described above are efficiently performed if carried out successively or simultaneously. For this purpose, a base body, a slide that relatively moves with respect to the base body, a gasket body holding section provided on the slide, and a suction passage provided such that the suction passage opens to the gasket body holding section are placed on a base.

Effect of the Invention

The present invention makes it possible to easily remove a carrier film even if a gasket body is adhered to the carrier film when the carrier film is removed from the gasket body in a carrier-film-equipped gasket including a combination of a rubber-only type gasket body and a resinous carrier film that retains the gasket body. Hence, the operation for removing the carrier film can be made easier, thus enabling the handling property for the carrier-film-equipped gasket to be improved.

BRIEF EXPLANATION OF THE DRAWINGS

FIGS. 2(A) to 2(D) are explanatory diagrams illustrating the manufacturing process of the gasket;

FIGS. 6(A) and 6(B) are explanatory diagrams illustrating a peeling step;

FIGS. 12(A) and 12(B) are explanatory diagrams illustrating a gasket body installing step according to another embodiment of the present invention;

FIGS. 15(A) to 15 (D) are explanatory diagrams illustrating the manufacturing process of the gasket.

DETAILED DESCRIPTION OF PREFERRED EMBODIMENTS

The following will describe an embodiment of the present invention with reference to the accompanying drawings.

Embodiments

Figure 1A:
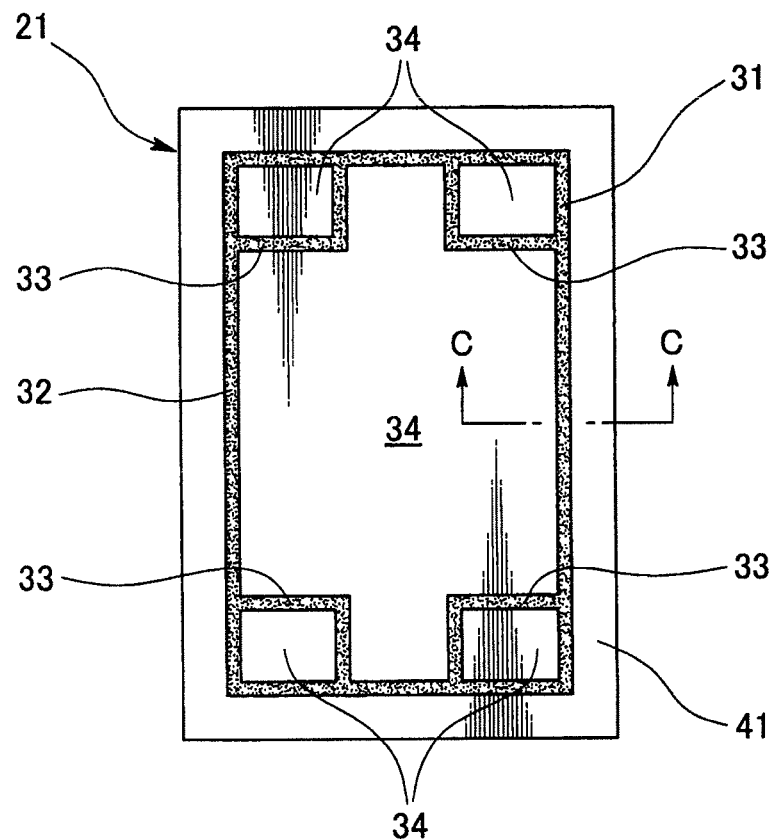
FIGS. 1(A) and 1(B) illustrate an example of a carrier-film-equipped gasket to be handled by the handling method according to an embodiment of the present invention, FIG. 1(A) being a plan view thereof, and FIG. 1(B) being a sectional view of an essential section thereof and an enlarged sectional view taken on line C-C in FIG. 1(A)

The method for handling a carrier-film-equipped gasket according to the embodiment is a method intended for handling a carrier-film-equipped gasket 21 illustrated in FIG. 1 and, more specifically, a method for removing a resinous carrier film 41 from a rubber-only type gasket body 31 in a carrier-film-equipped gasket 21 including a combination of the gasket body 31 and the carrier film 41 that retains the gasket body 31. Although the gasket body 31 and the carrier film 41 do not adhere to each other, there are some cases where the gasket body 31 adheres to the carrier film 41 mainly due to the characteristic of the material of the gasket body 31. The gasket body 31 is used as, for example, a fuel battery gasket.

Figure 1B:
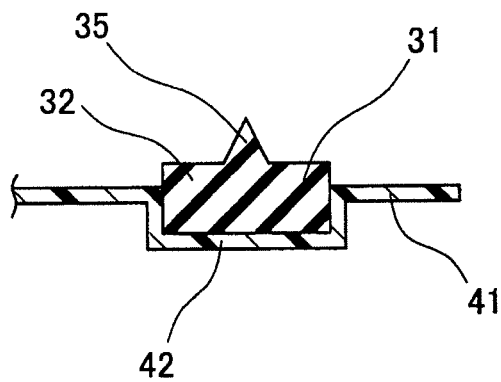

The gasket body 31 is made of a predetermined rubber-like elastic material (e.g. VMQ, PIB, EPDM, and FKM) and formed to have a planar shape (flat plate shape) as a whole. An outer peripheral sealing section 32 that seals the entire periphery of the reaction surface of a fuel battery is provided like a planar rectangular frame. Further, in order to partition the reaction surface of the fuel battery and each manifold section, inner sealing sections (manifold sealing sections) 33 are integrally provided at both ends in the longitudinal direction of the outer peripheral sealing section 32. Reference numeral 34 denotes a through hole (void) that passes through the gasket body 31 in the direction of the thickness thereof. As illustrated in FIG. 1(B), the cross-sectional shape of the gasket body 31 is rectangular, and a sealing lip 35 having a triangular cross section is formed integrally with the upper surface of the rectangular cross section of the gasket body 31.

The carrier film 41 is made of a resinous film and has a planar rectangular shape that is slightly larger than the gasket body 31. A gasket holding section 42 having a three-dimensional shape to retain the gasket body 31 is provided at a portion which is a part of the plane of the carrier film 41 and which planarly overlaps the gasket body 31. As the resinous film, a polypropylene film, for example, which has a thickness of 0.2 mm, is used, and the polypropylene film is cut to a predetermined planar shape. As the resinous film, a general resinous material, such as polyethylene or polystyrene, can be used in place of polypropylene. The thickness of the film is preferably about 0.1 mm to about 0.3 mm, although the thickness depends on the diameter or the cross-sectional shape of the gasket body 31. The carrier film 41 is referred to also as the carrier sheet or the gasket holding member.

The carrier-film-equipped gasket 21 is manufactured as described below. For the manufacture, a mold (rubber forming mold) for injection-molding the rubber-only type gasket body 31 can be used.

In the process, first, the planar carrier film 41, which has been cut into a planar shape of a predetermined size, is prepared. Then, the carrier film 41 is held in a parting section 54 of a mold 51 and mold-clamped by the mold 51, as illustrated in FIG. 2(A). The mold 51 is composed of a combination of an upper die (one split die) 52 and a lower die (the other split die) 53, and each of the dies 52 and 53 has a cavity 55 corresponding thereto at the parting section 54. The entire surface of the carrier film 41 in its initial state is planar, so that the carrier film 41 is laid across the inside of the cavities 55.

Subsequently, as illustrated in FIG. 2(B), a molding material for molding the gasket body 31 is charged into the cavities 55 and heated or the like to mold the gasket body 31. When the molding material is charged in the cavities 55, a part of the plane of the carrier film 41 is pressed against the inner surface of the cavity 55 of the lower die 53 by the molding material charging pressure and deformed (plastically deformed) along the inner surface of the cavity 55, thus molding the gasket holding section 42 having the three-dimensional shape.

Subsequently, after molding the gasket body 31, the mold is opened, as illustrated in FIG. 2(C), and the gasket body 31 and the carrier film 41 are simultaneously taken out of the mold 51, as illustrated in FIG. 2(D). The gasket body 31 and the carrier film 41, which have been taken out, are in a combined state in which the gasket body 31 is retained by the carrier film 41. The product is conveyed or stored in the combined state. The gasket body 31 retained by the carrier film 41 is resistant to twisting or the like, thus improving the handling property over the case where the gasket body 31 is handled alone.

Although the gasket body 31 and the carrier film 41 are not supposed to adhere to each other, there are cases where the surface of the gasket body 31 becomes adhesive due to the characteristic of the material of the gasket body 31 or due to need in molding by the mold 51, and the adhesion inconveniently causes the gasket body 31 to adhere to the carrier film 41. According to the present embodiment, therefore, the operation for removing the carrier film 41 from the gasket body 31 is performed according to the following procedure.

Figure 3A:
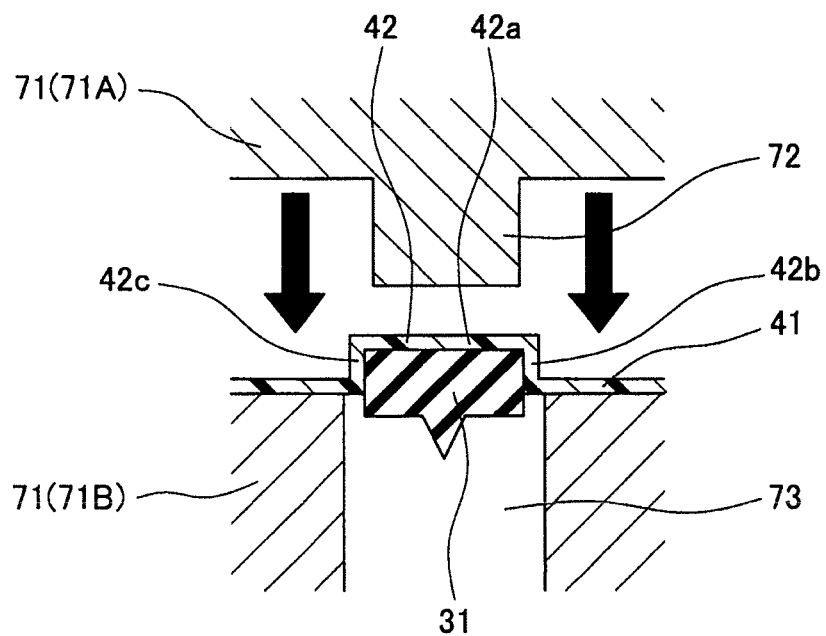
FIGS. 3(A) and 3(B) are explanatory diagrams illustrating a preliminary step.
Figure 3B:
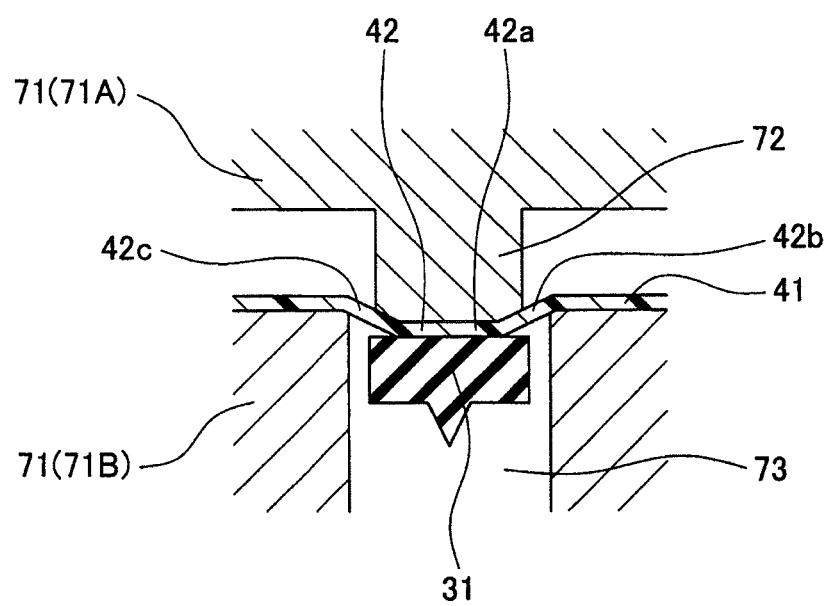

First, as a preliminary step (pretreatment step), the carrier-film-equipped gasket 21 is placed on a pressing device 71, and the gasket body 31 is pressed from the carrier film 41 side by using the pressing device 71 thereby to decrease the adhesion area between the gasket body 31 and the carrier film 41, as illustrated in FIGS. 3(A) and 3(B).

More specifically, as described above, the carrier film 41 has the gasket holding section 42, which has the three-dimensional shape resulting from the deformation along the external shape of the gasket body 31, at the portion that planarly overlaps the gasket body 31, and the carrier film 41 and the gasket body 31 adhere to each other in the state in which a part or all of the gasket body 31 is held in the gasket holding section 42 having the three-dimensional shape. Hence, the adhesion area between the carrier film 41 and the gasket body 31 is defined by the area of the inner surface of the gasket holding section 42.

More specifically, since the gasket body 31 has the rectangular cross section, the adhesion area is the sum of the area of a bottom surface 42a of the gasket holding section 42, which bottom surface 42a adheres to the bottom surface of the gasket body 31, the area of one side surface 42b of the gasket holding section 42, which one side surface 42b adheres to a part of one side surface of the gasket body 31, and the area of the other side surface 42c of the gasket holding section 42, which other side surface 42c adheres to a part of the other side surface of the gasket body 31. The adhesion area, which is the sum of the above areas, is decreased as follows. As described above, when the gasket body 31 is pressed from the carrier film 41 side by the pressing device 71, the one side surface 42b of the gasket holding section 42 comes off of the one side surface of the gasket body 31, the other side surface 42c of the gasket holding section 42 comes off of the other side surface of the gasket body 31, and a part (the portions on both ends in the width direction) of the bottom surface 42a of the gasket holding section 42 comes off of the bottom surface of the gasket body 31, as illustrated in FIG. 3(B). As a result, the remaining adhesion section is only a part (a part at the center in the width direction) of the bottom surface 42a of the gasket holding section 42. This completes the preliminary step.

To carry out the preliminary step, a pressing constituent element 71A of the pressing device 71 is provided with a pressing projection section 72 for pressing the gasket body 31 from the carrier film 41 side (from the bottom surface 42a side of the gasket holding section 42), and corresponding thereto, a to-be-pressed constituent element 71B of the pressing device 71 is provided with a receiving void 73 for temporarily accommodating the gasket body 31 when displaced by being pressed.

Figure 4A:
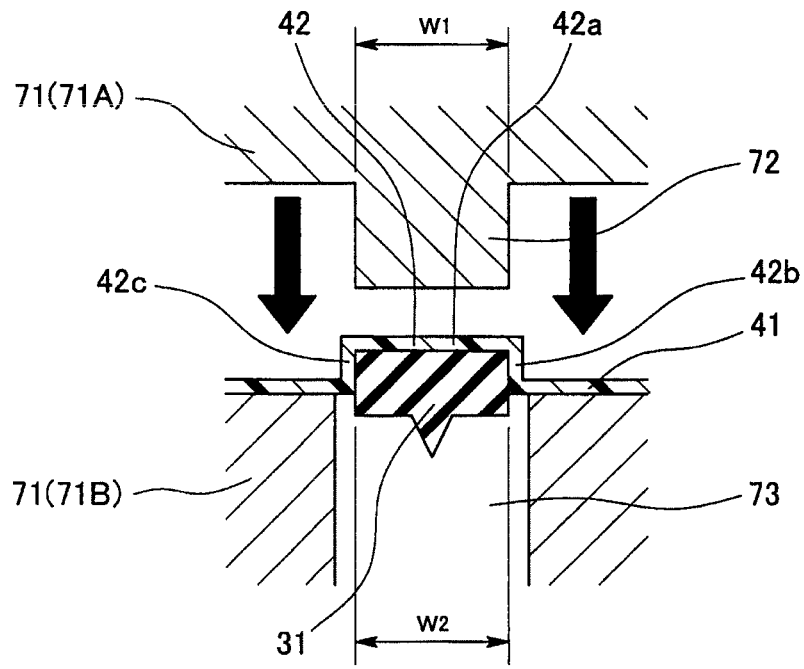
FIGS. 4(A) and 4(B) are explanatory diagrams illustrating the preliminary step and the width dimension of a pressing projection section.
Figure 4B:
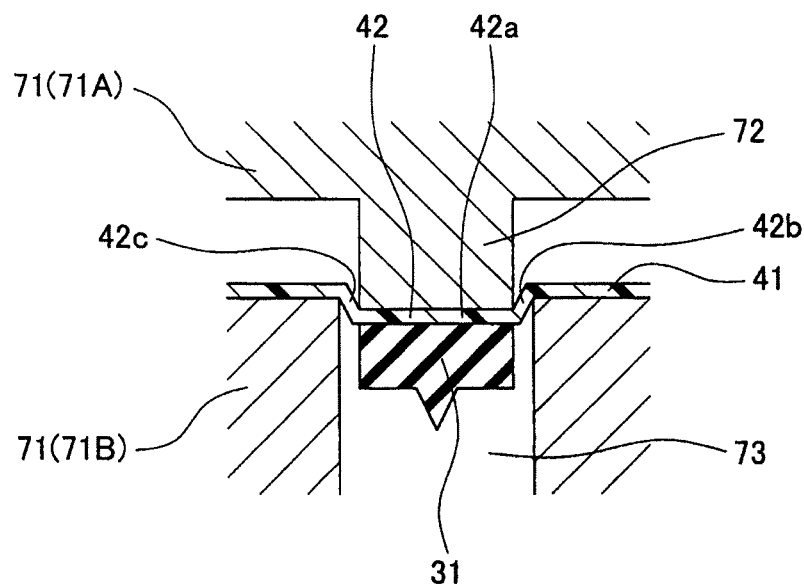
Figure 5A:
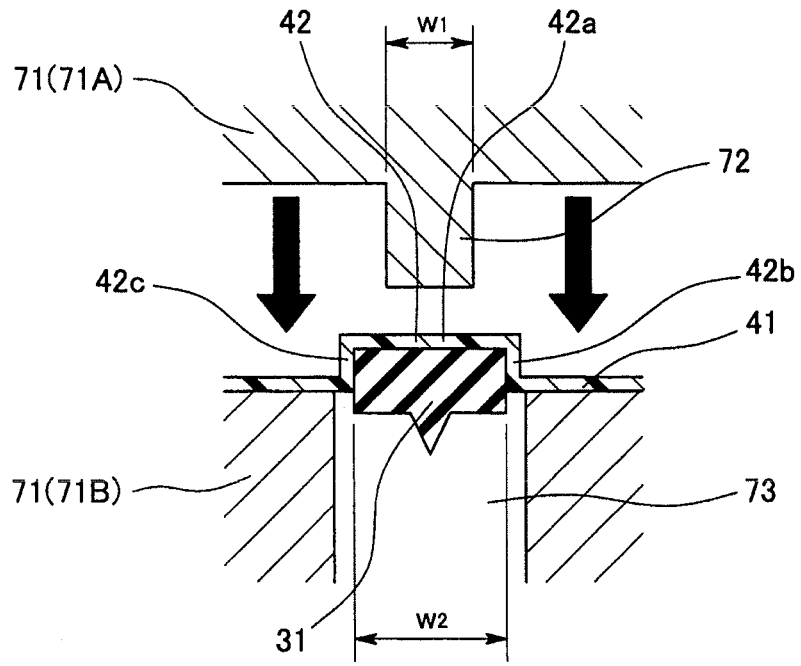
FIGS. 5(A) and 5(B) are explanatory diagrams illustrating the preliminary step and the width dimension of the pressing projection section.
Figure 5B:
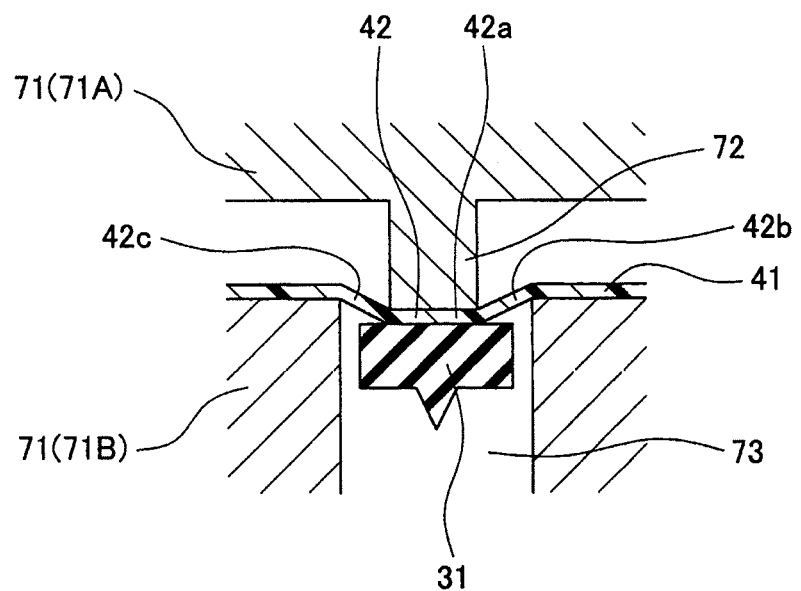

A width dimension $w_1$ of the pressing projection section 72 may be set to be equal to or larger than a width dimension $w_2$ of the gasket body 31, as illustrated in FIGS. 4(A) and 4(B), or the width dimension $w_1$ may be set to be smaller than the width dimension $w_2$ of the gasket body 31, as illustrated in FIG. 5(A) and 5(B). In the latter case, the pressing projection section 72 presses only a part (a part at the center in the width direction) of the bottom surface of the gasket body 31, so that the one side surface 42b of the gasket holding section 42 will come off of the gasket body 31, the other side surface 42c of the gasket holding section 42 will come off of the gasket body 31, and a part (the portions at both ends in the width direction) of the bottom surface 42a of the gasket holding section 42 will come off of the gasket body 31, as described above. Thus, the remaining adhesion part will be only a part (the part at the center in the width direction) of the bottom surface 42a of the gasket holding section 42, so that the adhesion area can be significantly decreased.

Subsequently, following the foregoing preliminary step, the carrier-film-equipped gasket 21 is placed on a suction section 62 of a vacuuming device 61 serving as a base, the gasket body 31 is fixed (suctioned) by vacuuming (arrow S), and in this state, the carrier film 41 is peeled from the gasket body 31 by using a chucking device (not illustrated) or the like, as illustrated in FIGS. 6(A) and 6(B). At this time, since the adhesion area between the carrier film 41 and the gasket body 31 has already been decreased in the preliminary step, the carrier film 41 can be removed from the gasket body 31 with a relatively small peeling force and in a short peeling time. Therefore, as intended by the present invention, even if the gasket body 31 is adhered to the carrier film 41, the carrier film 41 can be easily removed, thus enabling the operation for removing the carrier film 41 to be accomplished more easily.

Various cross-sectional shapes are conceivable as the cross-sectional shape of the carrier-film-equipped gasket 21 including the combination of the rubber-only type gasket body 31 and the resinous carrier film 41, and the cross-sectional shape is not limited to the one illustrated in FIG. 1(B) described above.

Figure 7A:
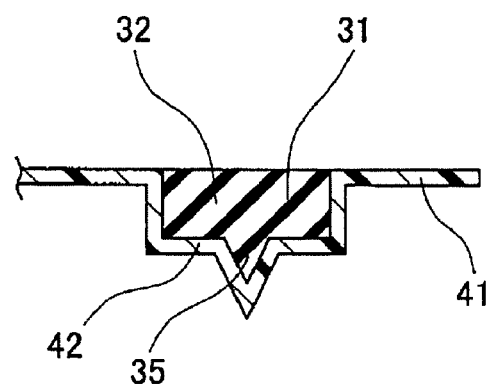
FIGS. 7(A) and 7(B) are sectional views of an essential section, illustrating another example of the gasket.

For example, in the example illustrated in FIG. 7(A), a sealing lip 35 is formed integrally with the bottom surface rather than the top surface of the gasket body 31 having a rectangular cross section. Accordingly, the shape of the gasket holding section 42 having a three-dimensional shape in the carrier film 41 has been changed.

Figure 7B:
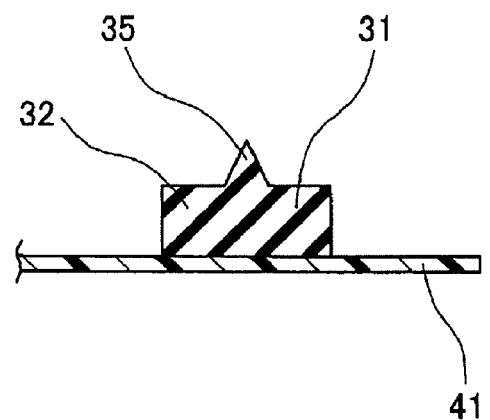

Further, the present invention also includes a case where the carrier film 41 is used in the planar shape without the gasket holding section 42, which has a three-dimensional shape, as illustrated in FIG. 7(B). In this case, the adhesion area between the carrier film 41 and the gasket body 31 is defined by the area of the bottom surface of the gasket body 31. Therefore, when the preliminary step described above is carried out, the adhesion area defined by the area of the bottom surface of the gasket body 31 decreases. To be specific, the carrier film 41 is peeled off at both ends in the width direction of the bottom surface of the gasket body 31.

Further, in order to decrease the adhesion area by carrying out the foregoing preliminary step, the pressing projection section 72 provided on the pressing constituent element 71A of the pressing device 71 may be configured as described below.

In the foregoing embodiment, the pressing projection section 72 is provided over the full length in the longitudinal direction of the gasket body 31 to press the gasket body 31 by the full length in the longitudinal direction thereof. Instead, the pressing projection section 72 may be configured to have a plurality of projections arranged with intervals provided therebetween along the longitudinal direction of the gasket body 31, thus providing non-pressing portions which are formed by voids between the projections that are adjacent to each other and which do not press the gasket body 31.

Figure 8:
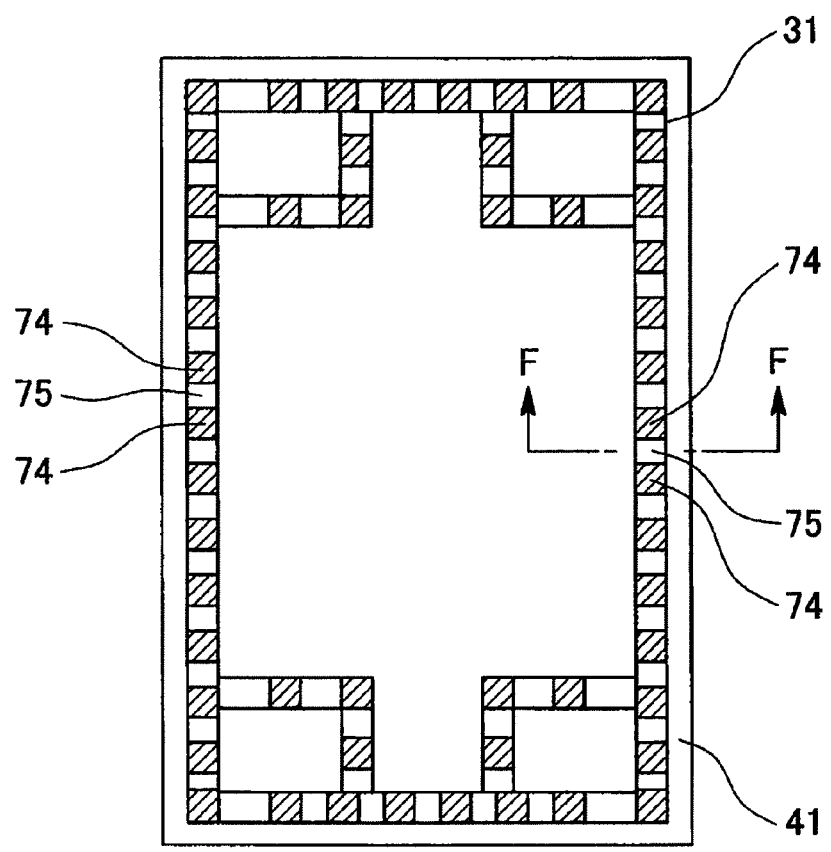
FIG. 8 is an explanatory diagram illustrating the planar placement of pressing projections.

FIG. 8 illustrates an example of the plurality of projections arranged in the case described above. The hatched portions in FIG. 8 denote portions 74 where the projections are disposed, and the blank portions in FIG. 8 denote portions 75 where no projections are disposed, thus providing the non-pressing portions. As illustrated, both the portions 74 and 75 are alternately arranged along the longitudinal direction of the gasket body 31.

Figure 9A:
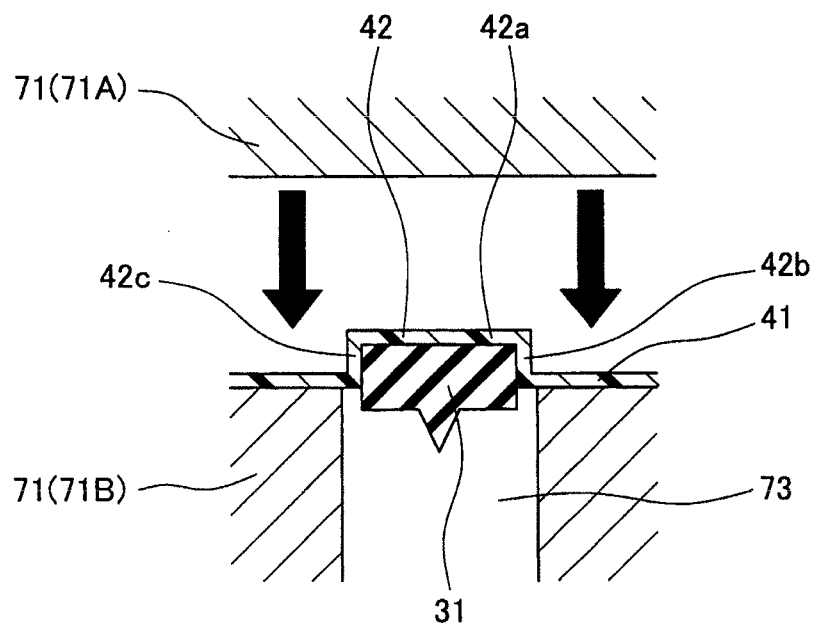
FIGS. 9(A) and 9(B) are explanatory diagrams of a preliminary step, and are explanatory diagrams which are taken on line F-F in FIG. 8 and which illustrate the preliminary step being carried out.
Figure 9B:
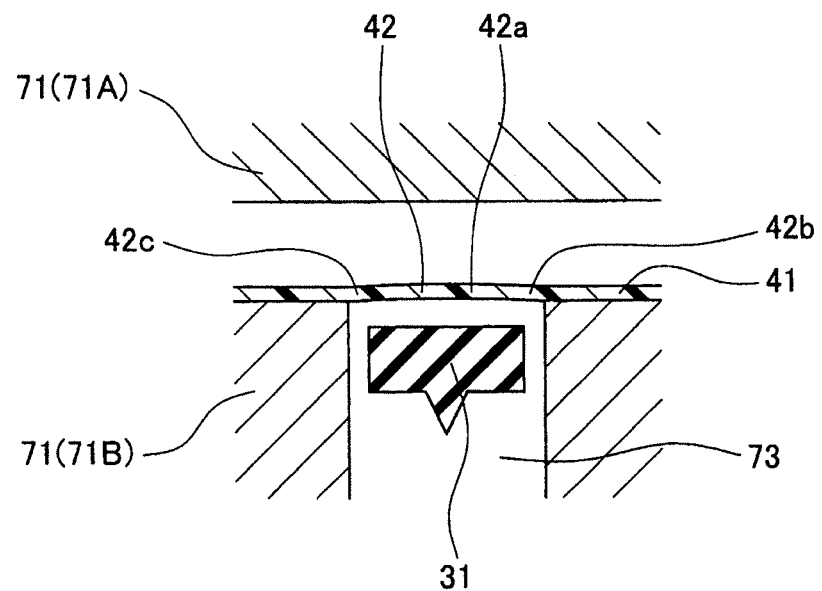

According to this configuration, at the portions 74 where the projections are disposed, the pressing projection section 72 presses the gasket body 31 through the intermediary of the carrier film 41, as illustrated in FIG. 4 and FIG. 5, so that only the pressed portions will remain as the portions where the carrier film 41 and the gasket body 31 adhere to each other. Meanwhile, the portions 75 which have no projections and provide the non-pressing portions will be the portions where the carrier film 41 and the gasket body 31 are not in the adherent state and are separate from each other since the portions 75 are free of projections, as illustrated in FIGS. 9(A) and 9(B). This permits a significant reduction in the adhesion area that will remain after the preliminary treatment.

Another Embodiment

The foregoing preliminary step for reducing the adhesion area between the gasket body 31 and the carrier film 41 and the peeling step for removing the carrier film 41 from the gasket body 31 can be accomplished with higher operation efficiency by successively or simultaneously carrying out these two steps. An embodiment in this case will be described below.

Figure 10A:
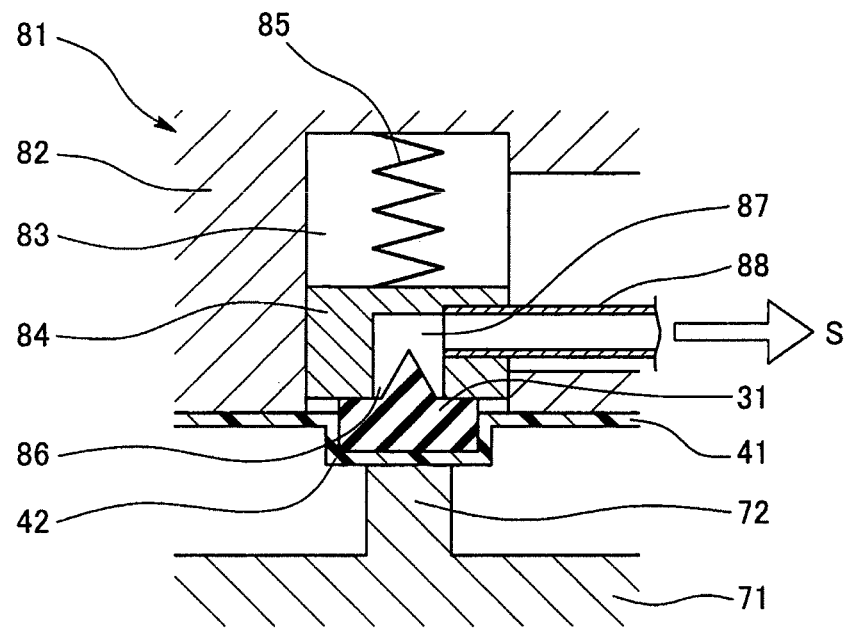
FIGS. 10(A) and 10(B) are explanatory diagrams illustrating a preliminary step according to another embodiment of the present invention.

As illustrated in FIG. 10(A), a base body 82 on a stationary side is provided on a base 81, and a recess (cylinder-like recess) 83 is provided in the base body 82 such that the recess 83 is opposed to a pressing projection section 72 of a pressing device 71. A slide section (piston-like slide member) 84 on a movable side is slidably installed in the recess 83, and a return spring 85, which returns the slide section 84 to an initial slide position, is provided at the bottom part of the recess 83.

The slide section 84 is provided with, as an opening section, a gasket body holding section 86 for retaining the gasket body 31 at the slide section 84, and a suction passage 87 for fixing, by suctioning, the gasket body 31 to the gasket body holding section 86 is provided such that the suction passage 87 is in communication with the opening section. The suction passage 87 is connected to a suction source, such as a vacuuming pump, which is not illustrated, through a pipe 88.

To start the preliminary step, the carrier-film-equipped gasket 21 is placed on the base 81 such that the gasket body 31 is positioned at the gasket body holding section 86 of the slide section 84, as illustrated in FIG. 10(A).

Figure 10B:
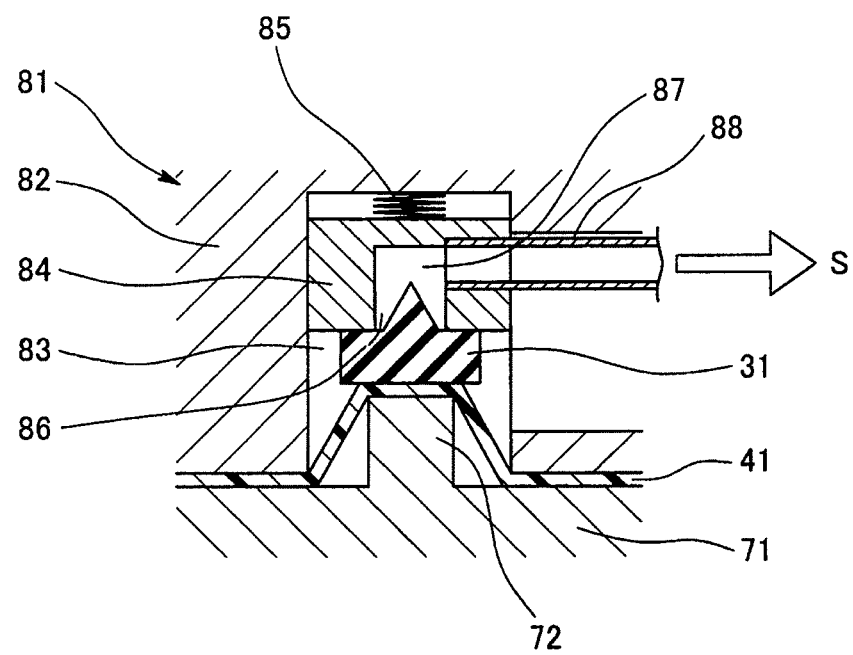

Subsequently, the suction source is driven to start vacuuming (arrow S) to fix, by suctioning, the gasket body 31 to the gasket body holding section 86 of the slide section 84. In this suction-fixed state, the gasket body 31 is pressed from the carrier film 41 side by the pressing projection section 72 of the pressing device 71, thereby reducing the adhesion area between the gasket body 31 and the carrier film 41, as illustrated in FIG. 10(B). When the gasket body 31 is pressed from the carrier film 41 side by the pressing projection section 72 of the pressing device 71, the slide section 84 is also pressed, causing the slide section 84 to move by sliding against the elasticity of the return spring 85.

Figure 11A:
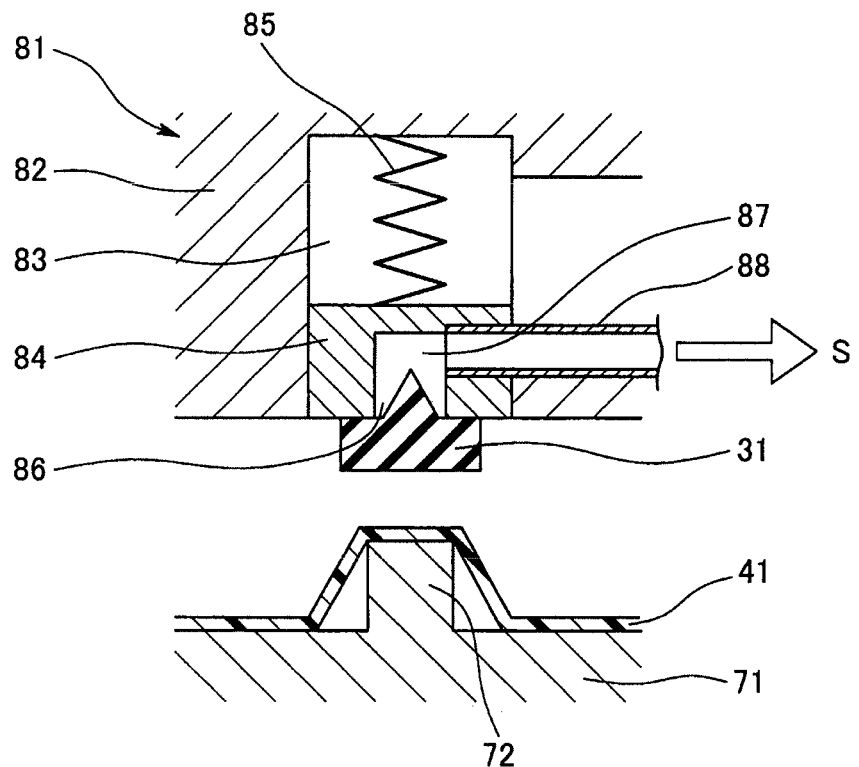
FIGS. 11(A) and 11(B) are explanatory diagrams illustrating a peeling step according to another embodiment of the present invention.

Subsequently, as illustrated in FIG. 11(A), the carrier film 41 is fixed to the pressing device 71, and the pressing device 71 with the carrier film 41 fixed thereto is moved to return (retract). Since the gasket body 31 remains fixed by suction to the base 81, the carrier film 41 is removed from the gasket body 31.

Figure 11B:
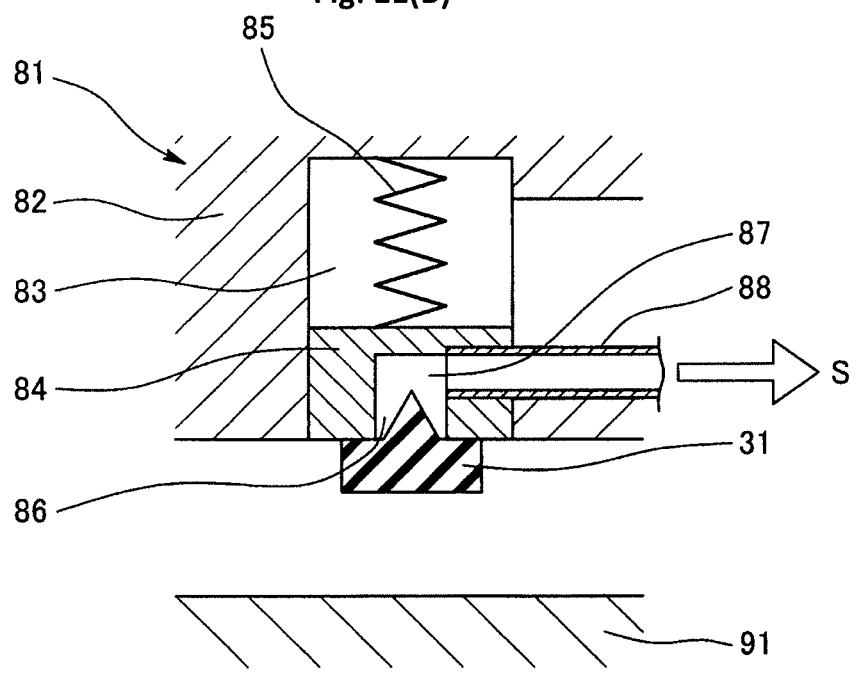
Figure 13A:
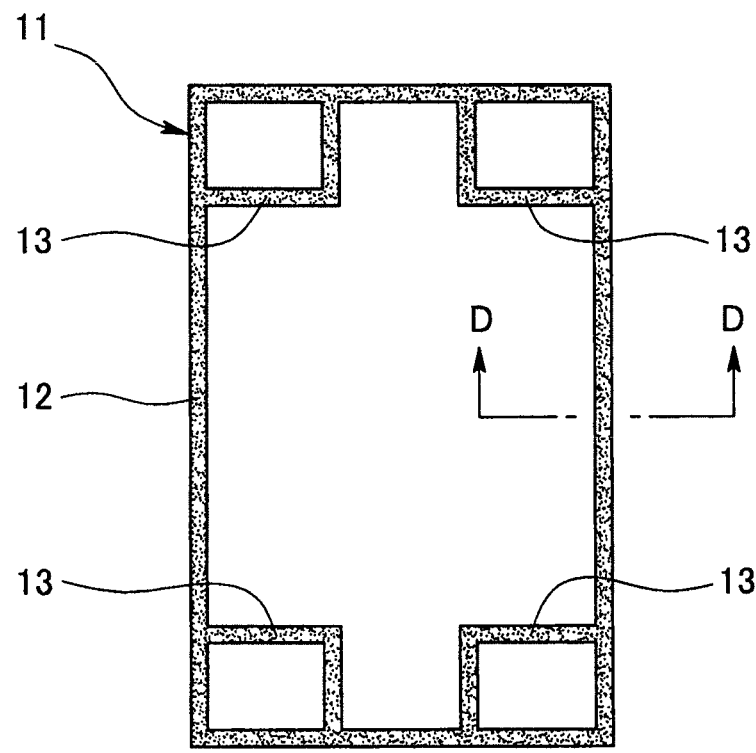
FIGS. 13(A) and 13(B) present diagrams illustrating a rubber-only type gasket according to a conventional example, FIG. 13(A) being a plan view thereof, and FIG. 13(B) being an enlarged sectional view of an essential section thereof taken on line D-D in FIG. 13(A)
Figure 13B:
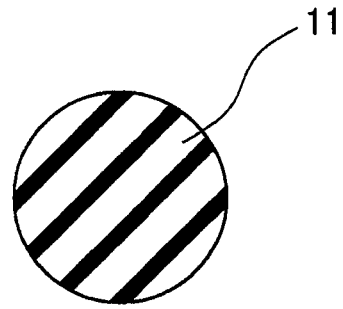
Figure 14A:
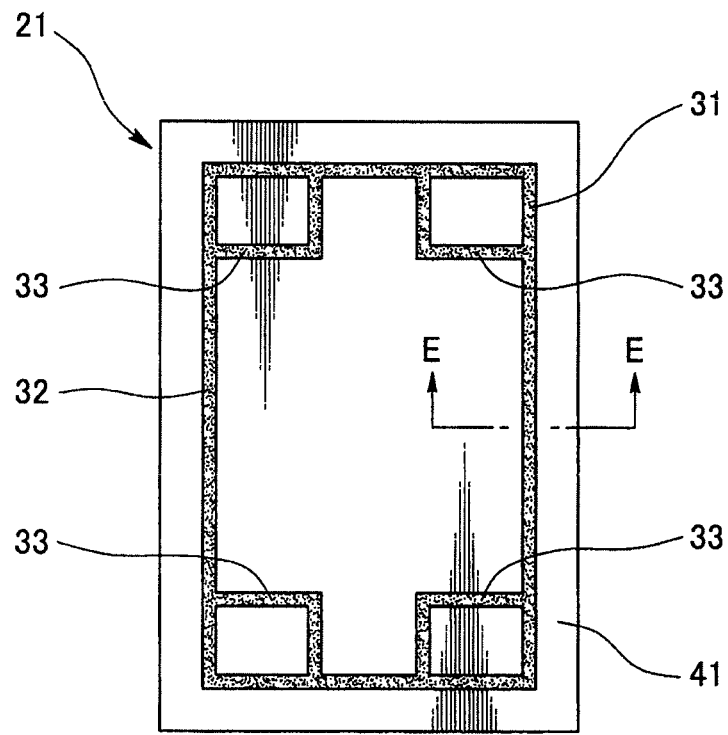
FIGS. 14(A) and 14(B) present diagrams illustrating a carrier-film-equipped gasket according to a reference example, FIG. 14(A) being a plan view thereof, and FIG. 14(B) being an enlarged sectional view of an essential section thereof taken on line E-E in FIG. 14(A)
Figure 14B:
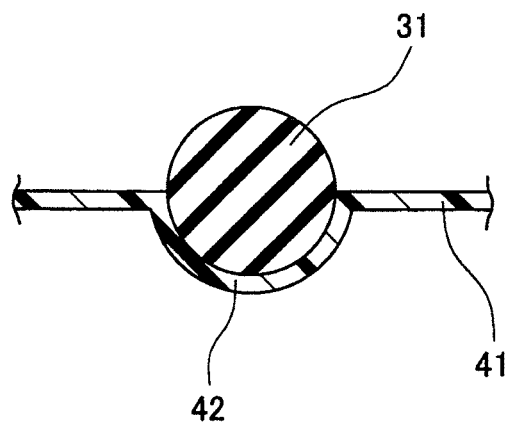
Figure 16A:
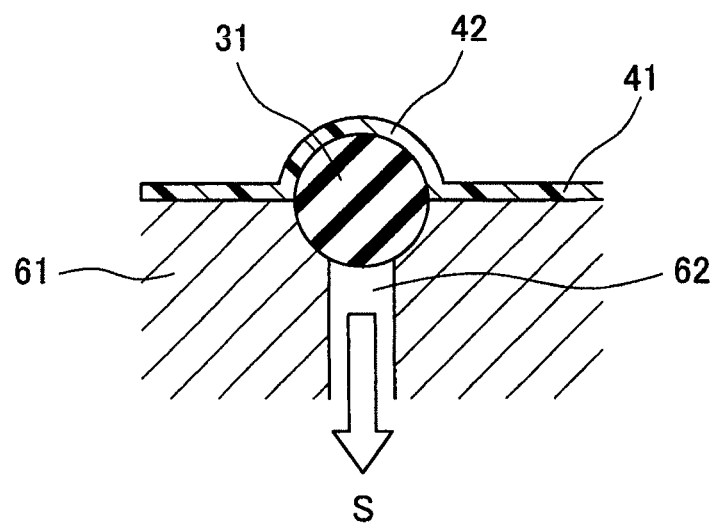
FIGS. 16(A) and 16(B) are explanatory diagrams illustrating a peeling step.
Figure 16B:
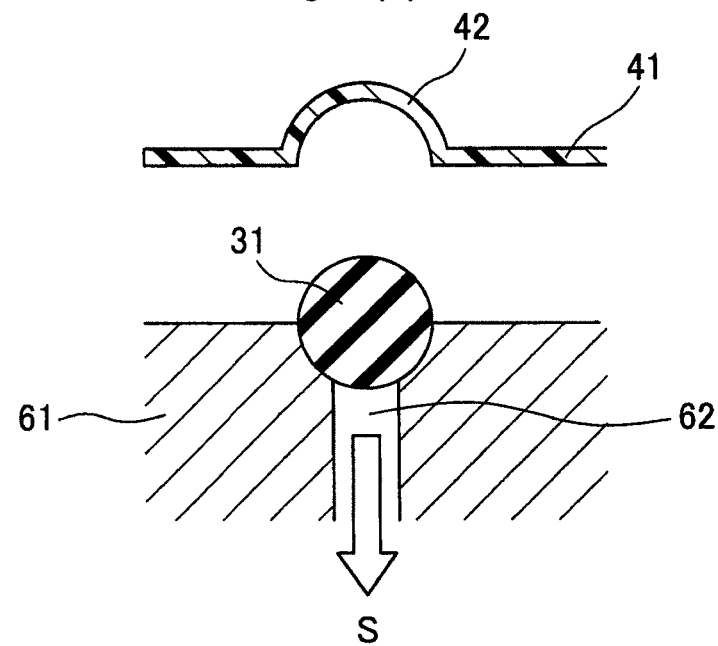

Subsequently, as illustrated in FIG. 11(B), the gasket body 31 fixed by suction to the base 81 is opposed to a mounting target part 91 of a fuel battery separator or the like, an adhesive agent is applied to the gasket body 31, as necessary, and the gasket body 31 is installed to the mounting target part 91, as illustrated in FIG. 12(A). This completes the mounting step, as illustrated in FIG. 12(B).

Accordingly, using the base 81 provided with the slide structure having the foregoing configuration enables the preliminary step and the peeling step to be carried out successively or simultaneously, thus making it possible to improve the operation efficiency.

DESCRIPTION OF REFERENCE NUMERALS 21 carrier-film-equipped gasket
31 gasket body
32 outer peripheral sealing section
33 inner sealing section
34 through hole
35 sealing lip
41 carrier film
42 gasket holding section
42a bottom surface
42b, 42c side surface
51 mold
52 upper die
53 lower die
54 parting section
55 cavity
61 vacuuming device
62 suction section
71 pressing device
71A pressing constituent element
71B to-be-pressed constituent element
72 pressing projection section
73 receiving void
74 portion where a projection is disposed
75 portion where no projections are disposed, thus providing a non-pressing portion
81 base
82 base body
83 recess
84 slide section
85 return spring
86 gasket body holding section
87 suction passage
88 pipe
91 mounting target part

What is claimed is:
1. A method for handling a carrier-film-equipped gasket, which is a method for removing a resinous carrier film from a rubber-only type gasket body in a carrier-film-equipped gasket including a combination of the gasket body and the carrier film, which retains the gasket body,
the method comprising:
peeling the carrier film from the gasket body against an adhesive force in a state in which the gasket body is fixed to a base, and
decreasing an adhesion area between the gasket body and the carrier film by pressing the gasket body from a carrier film side with a pressing device to separate a first adhered region of the carrier film from the gasket body and enable a second adhered region of the carrier film, which is in contact with a portion of the carrier film pressed by the pressing device, to remain adhered to the gasket body,
wherein the decreasing the adhesion area is preliminary to the peeling,
wherein the peeling is carried out in the state in which the adhesion area has been decreased.
2. The method for handling a carrier-film-equipped gasket according to claim 1,
wherein the carrier film includes, in a portion that planarly overlaps the gasket body, a gasket holding section having a three-dimensional shape that has been deformed along an external shape of the gasket body,
the carrier film and the gasket body adhere to each other in a state in which a part or all of the gasket body is placed in the gasket holding section, the adhesion area being defined by the area of an inner surface of the gasket holding section, and
wherein the decrease in the adhesion area is defined by the area of the inner surface of the gasket holding section.
3. The method for handling a carrier-film-equipped gasket according to claim 1,
wherein the pressing device has a pressing projection section that presses the gasket body from the carrier film side, and
a width dimension of the pressing projection section is set to be smaller than a width dimension of the gasket body.
4. The method for handling a carrier-film-equipped gasket according to claim 1,
wherein the pressing device has a pressing projection section that presses the gasket body from the carrier film side, and the pressing projection section has a plurality of projections arranged with intervals provided therebetween along a longitudinal direction of the gasket body, and voids between the projections form non-pressing portions which do not press the gasket body.

5. The method for handling a carrier-film-equipped gasket according to claim 1,
   wherein the decreasing the adhesion area and the peeling are successively carried out.

6. The method for handling a carrier-film-equipped gasket according to claim 5,
   wherein, in order to successively carry out the decreasing the adhesion area and the peeling, the base has a base body, a slide that relatively moves with respect to the base body, a gasket body holding section provided at the slide, and a suction passage provided such that the suction passage opens to the gasket body holding section.

7. The method for handling a carrier-film-equipped gasket according to claim 1,
   wherein the carrier film includes a gasket holding section defined by a recess in which the gasket body is positioned,
   providing the first adhered region and the second adhered region as part of the recess, and
   pressing the gasket holding section with the pressing device so as to eliminate the recess, thereby decreasing the adhesion area.

* * * * *